United States Patent [19]
Wolf et al.

[11] Patent Number: 4,608,655
[45] Date of Patent: Aug. 26, 1986

[54] WRISTWATCH DOSIMETER

[75] Inventors: Michael A. Wolf; David A. Waechter; C. John Umbarger, all of Los Alamos, N. Mex.

[73] Assignee: The Regents of the University of California, Berkeley, Calif.

[21] Appl. No.: 704,900

[22] Filed: Feb. 22, 1985

Related U.S. Application Data

[63] Continuation of Ser. No. 369,305, Apr. 16, 1982, abandoned.

[51] Int. Cl.⁴ .................................................. G01T 1/16
[52] U.S. Cl. ...................................... 364/569; 364/414; 250/370; 368/10
[58] Field of Search ................ 364/414, 415, 569, 705, 364/707–710, 715; 340/600; 250/336.1, 370, 390; 368/10

[56] References Cited

U.S. PATENT DOCUMENTS

| | | | |
|---|---|---|---|
| 3,114,837 | 12/1963 | Thomas | 250/370 |
| 3,221,317 | 11/1965 | Ferrigno, Jr. | 340/600 |
| 3,878,496 | 4/1975 | Erickson | 340/600 |
| 3,928,960 | 12/1975 | Reese | 364/705 |
| 3,999,071 | 12/1976 | Siffert et al. | 250/390 |
| 4,022,014 | 5/1977 | Lowdenslager | 364/705 |
| 4,197,461 | 4/1980 | Umbarger et al. | 340/600 |
| 4,301,367 | 11/1981 | Hsu | 340/600 |
| 4,320,393 | 3/1982 | Engdahl | 340/600 |
| 4,415,237 | 11/1983 | Fox | 250/336.1 |
| 4,428,050 | 1/1984 | Pellegrino et al. | 364/569 |

Primary Examiner—Gary Chin
Attorney, Agent, or Firm—Fitch, Even, Tabin & Flannery

[57] ABSTRACT

The disclosure is directed to a wristwatch dosimeter utilizing a CdTe detector, a microprocessor and an audio and/or visual alarm. The dosimeter is entirely housable with a conventional digital watch case having an additional aperture enabling the detector to receive radiation.

11 Claims, 10 Drawing Figures

WRISTWATCH DOSIMETER

This invention is a result of a contract with the Department of Energy (contract W-7405-ENG-36).

This application is a continuation of application Ser. No. 369,305 filed Apr. 16, 1982, now abandoned.

BACKGROUND OF THE INVENTION

The invention relates to portable radiation detectors and more particularly to portable radiation detectors utilizing a CdTe crystal in a conventional digital wristwatch housing.

In a continuing search for better ways to measure real time exposures to radiation received by workers in the nuclear industry, the wristwatch dosimeter of the invention was developed. It utilizes a CdTe detector similar to that disclosed in U.S. Pat. No. 4,197,461 issued Apr. 8, 1980 to Umbarger et al. and a low-battery power computer to process data. In accordance with the invention, this results in a tiny new instrument capable of sounding an alarm when a dangerous radiation field exists by measuring the radiation field either in a timer/scaler mode or as a ratemeter and alarming when the background increases suddenly or total exposure exceeds a set amount. When not in use as a radiation instrument, it can function as a digital watch. The instrument resembles a digital watch in form which is advantageous. A person normally puts on his or her watch in the morning and does not take it off until he or she goes to bed at night. The instrument can therefore be worn during waking hours other than on the job hours because it both functions as and looks like a conventional digital watch. This makes it easier than previously possible for workers in the nuclear industry to carry an accurate and sophisticated yet simple to operate radiation measuring instrument at any time they are in a potentially hazardous location. The instrument thereby insures less oportunity for serious exposures to occur by timely measurement and warning of dangerous radiation levels.

SUMMARY OF THE INVENTION

In accordance with the invention there is provided a wristwatch dosimeter comprising a digital wristwatch type housing having a window for a numerical display and a detector aperture. A watch-type LCD or LED display is positioned in the window of the housing and conventional digital watch controlling electronics are disposed in the housing and communicate with the display. A CdTe detector is located in said housing behind the aperture. A microprocessor is connected to the detector for accumulating and storing radiation field and exposure parameters. The housing also includes a storage device having predetermined safety limits of radiation field and exposure. The microprocessor disposed in the housing is used to compare predetermined limits of radiation field and exposure with the parameters constantly being read by the detector. An alarm, such as an audio or visual alarm connected to the microprocessor, is also within the housing for cautioning the user when a hazardous level is reached. In the preferred embodiment the instrument is powered by a battery with a mean lifetime of about 100 hours when operated in the wristwatch mode.

One object of the present invention is to provide an alarm for nuclear workers working in radiation environments.

Another object of the instant invention is to provide a radiation alarm in a digital wristwatch type housing.

One advantage of the instant invention is that the radiation detector and alarm thereof are settable to alarm a wearer when a dangerous radiation field exists by measuring the radiation field in a timer/scaler mode or are settable as a ratemeter alarming when background radiation increases suddenly or total exposure exceeds a preselected amount.

Another advantage of the instant invention is that the radiation alarm thereof is extremely portable and is incorporatable within a conventional article generally worn by people.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF A PREFERRED EMBODIMENT OF THE INVENTION

Figure 1:
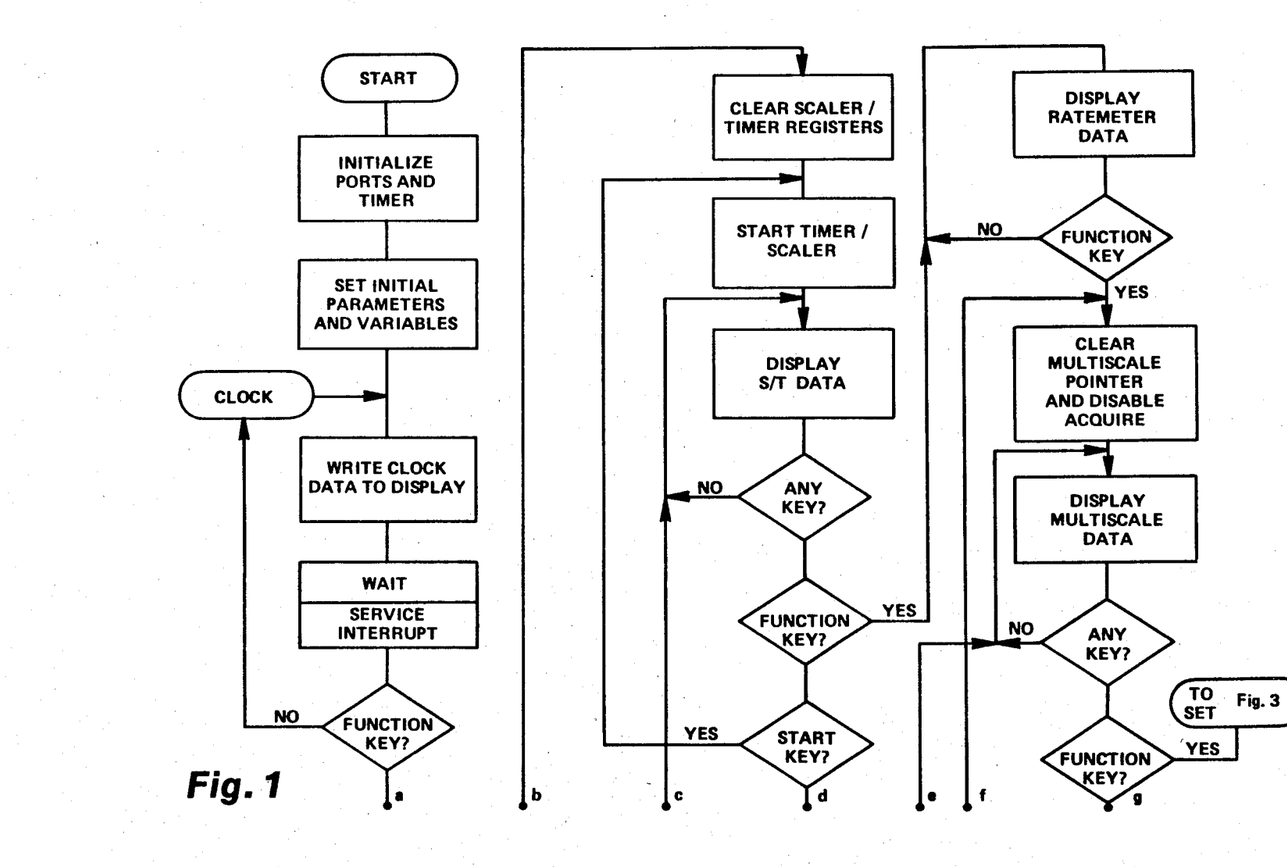
FIGS. 1-8 comprise a flow chart representative of how the logic circuits of the invention function.
Figure 2:
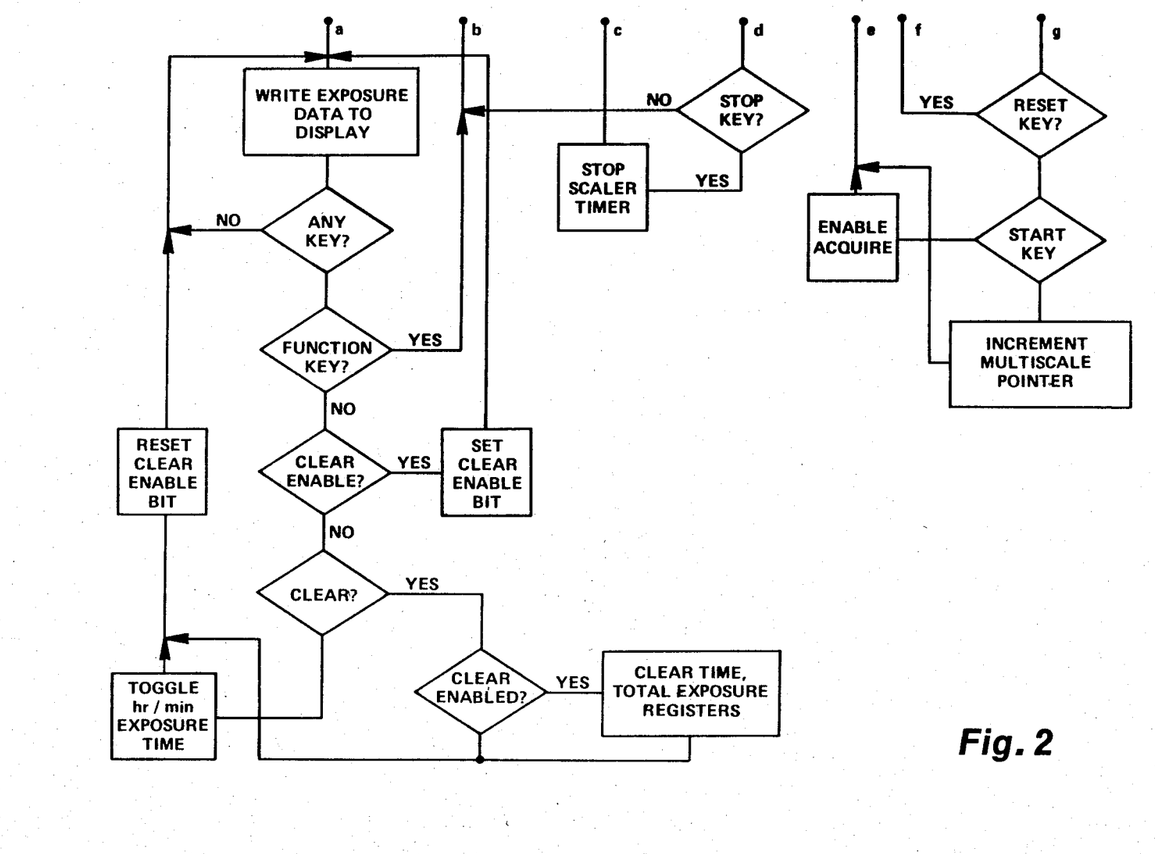
Figure 3:
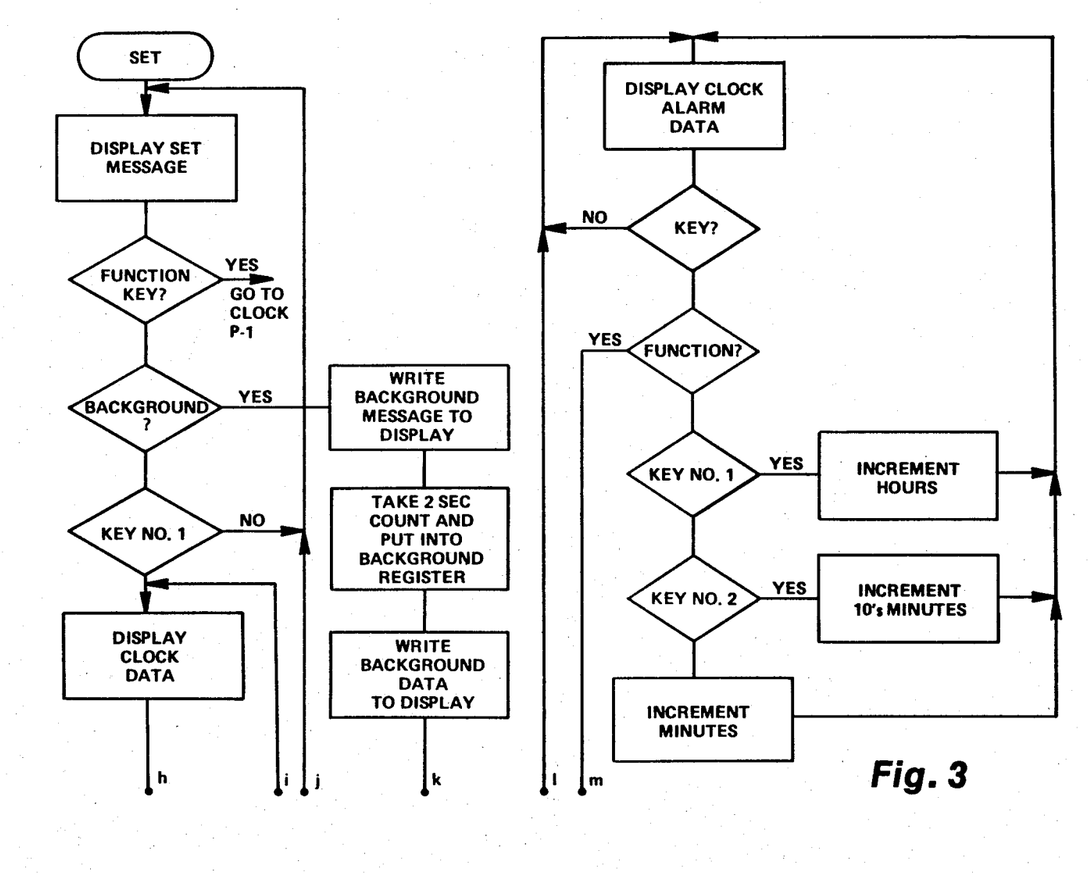
Figure 4:
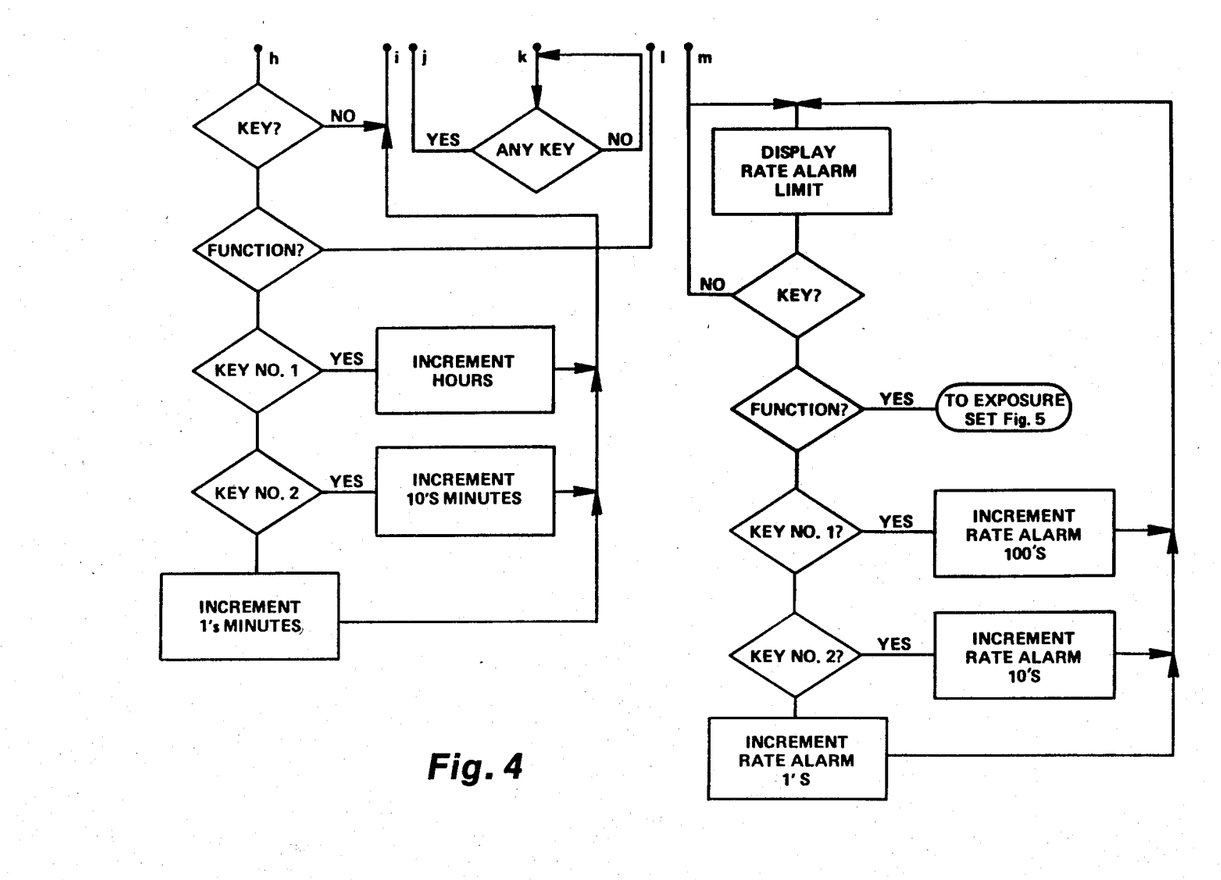
Figure 5:
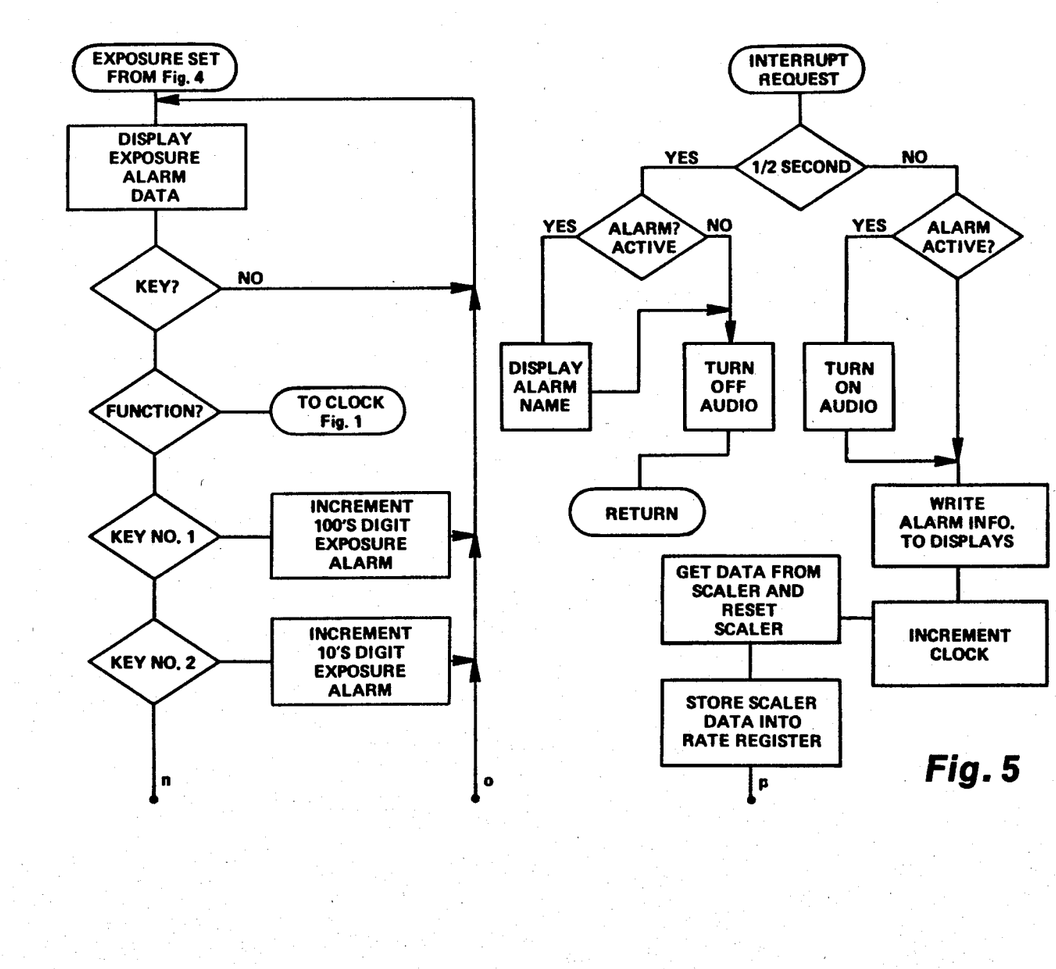
Figure 6:
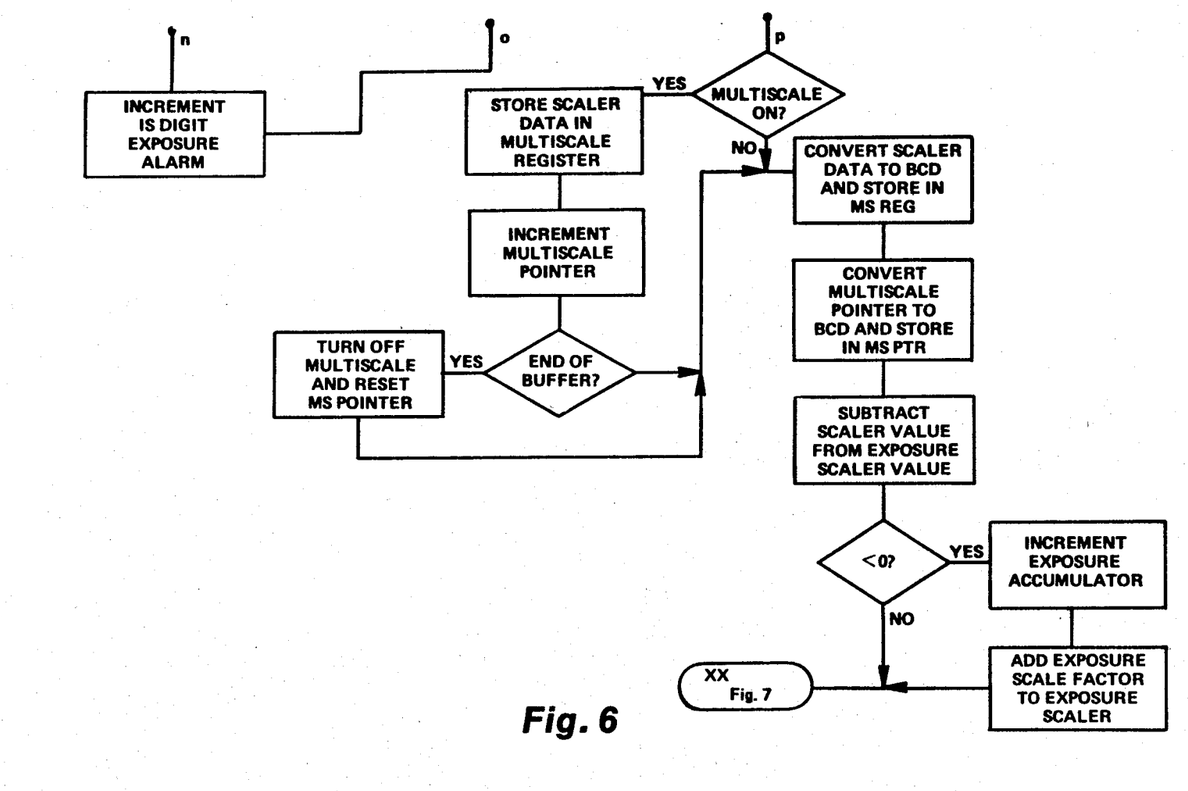
Figure 7:
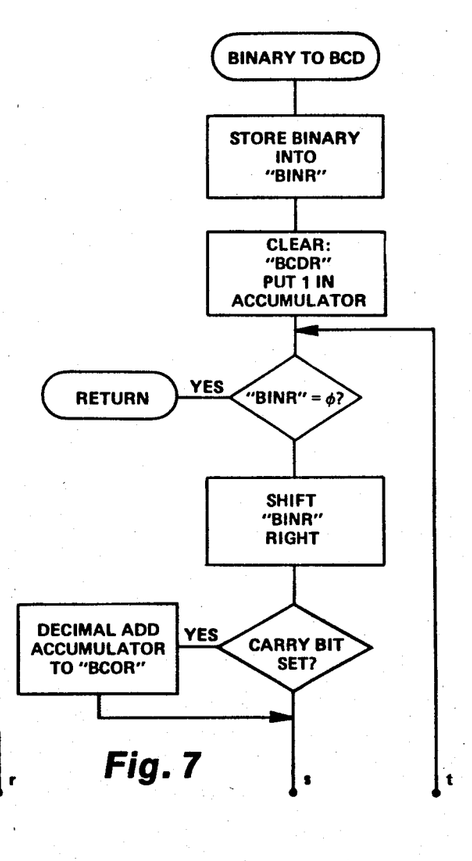
Figure 8:
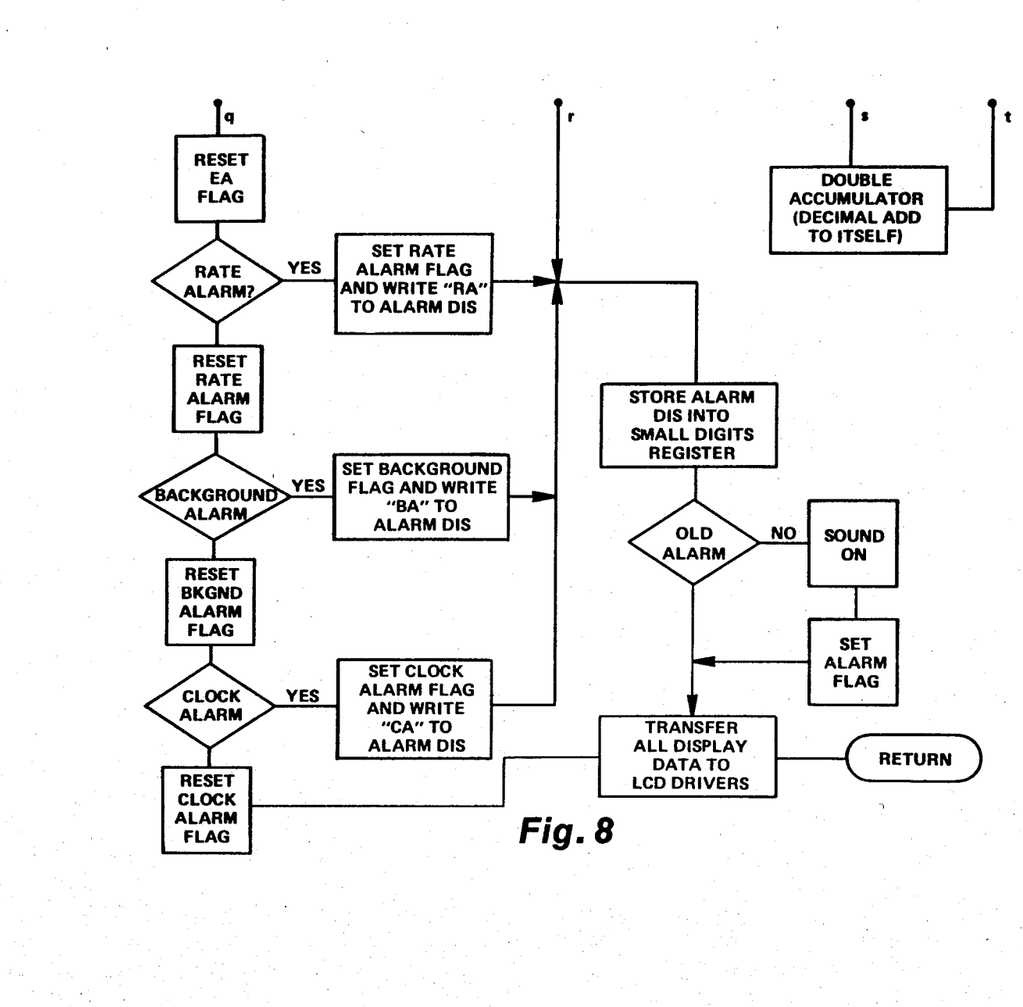
Figure 9:
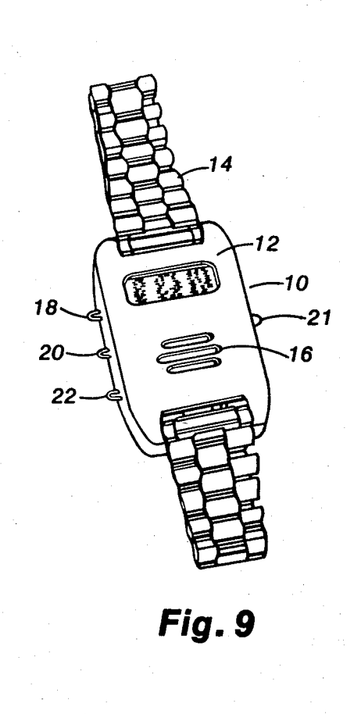
FIG. 9 illustrates a conventional digital wristwatch housing inaccordance with a preferred embodiment of the invention.

Reference is now made to FIG. 9 which illustrates a preferred embodiment of the invention housed in a digital watch style case measuring 20×25×8 mm and weighing 1.2 oz. While the case is a little large by wristwatch standards it is expected that those skilled in the art will be able to make future instruments smaller and lighter through the judicious use of layout and design of components including customized integrated circuits. The CdTe crystal of the invention is similar and may be the same as that used by the detector of U.S. Pat. No. 4,197,461. In the dosimeter of the invention the CdTe detector circuit of the U.S. Pat. No. 4,197,461 is coupled to a low-power microprocessor which counts input pulses, performs wristwatch functions and controls a liquid crystal display (LCD) or light emitting diode (LED) display. The instrument is powered by a battery with a mean lifetime of 100 hours when operated in the wristwatch mode. In FIG. 9, wristwatch case 10 is affixed to a conventional expandable wristwatch band 14. Case 10 has a display 12 and a detector aperture 16. Control buttons 18, 20, 21, and 22 allow various radiation alarms to be discussed hereinafter to be preset similar to normal digital watch timing alarms. Button 21 is the function control and sequentially selects the various display modes and alarm functions. Buttons 18, 20, 22 perform various functions such as Start, Stop, Reset, and Set applicable to the selected function.

Figure 10:
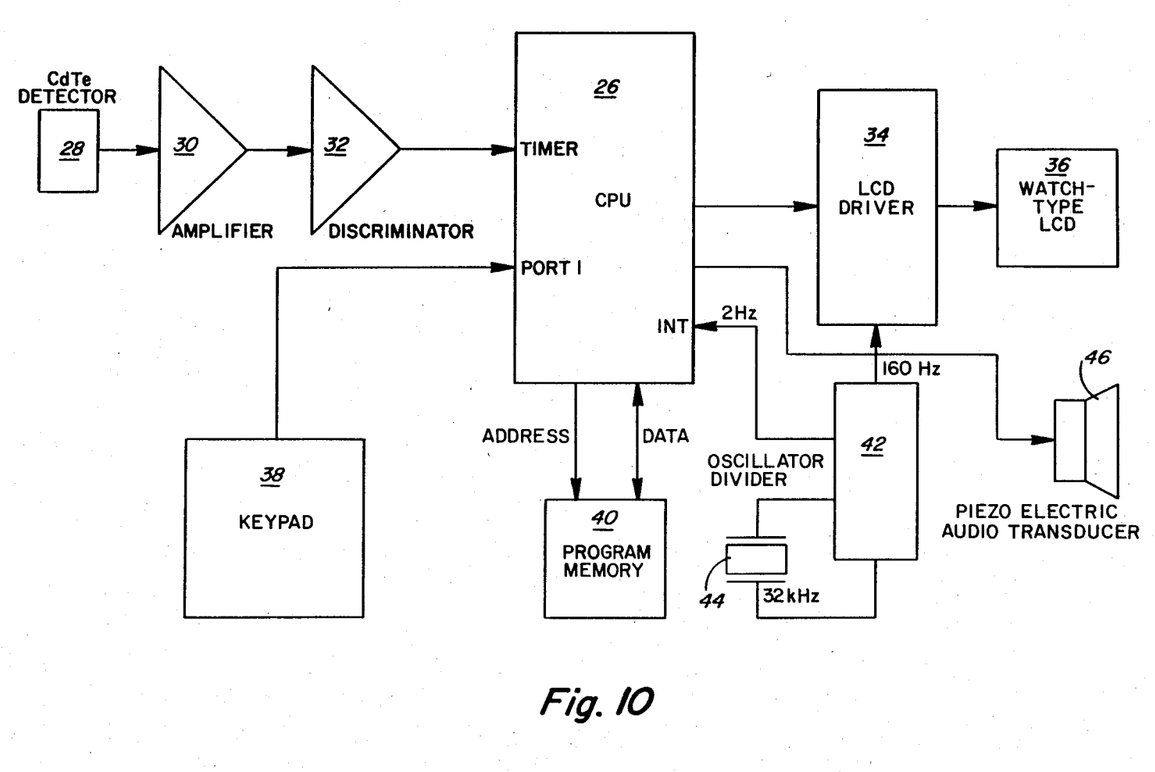
FIG. 10 is a block diagram of a dosimeter incorporatable in a conventional digital wristwatch in accordance with the invention.

Reference is now made to FIG. 10 which is a block diagram of a preferred embodiment of the invention. The dosimeter electronics are built on three ceramic substrates which are stacked vertically inside case 10. An input substrate contains a detector crystal and input amplifiers. A timing crystal, which is preferably a standard 32 kHz quartz crystal, is also mounted on the input substrate. A control substrate contains a control processor and its associated interface circuits. The third substrate is a memory substrate. The memory substrate contains read-only program memories for the microprocessor. As seen in FIG. 10 a CdTe detector 28 is connected through a FET amplifier 30 and a low power amplifier and discriminator 32 to a central processing unit (CPU) 26 which may comprise, for example, a Motorola MC 146805 CPU. Detector 28 connects to the timer of CPU 26. A keypad 38 connects to port 1 of CPU 26 and a program memory 40 such as a 1K external low power read-only memory (EPROM) connects through an address output and a data input-output to the CPU 26. CPU 26 connects through an LCD driver 34 to a watch-type LCD 36. CPU 26 also connects to a piezoelectric audio transducer 46 which provides a user with an audible alarm. An oscillator divider 42 driven by a 32 kHz quartz crystal 44 connects to the LCD driver 34 to provide the watch function and through an interface to the CPU 26.

The input of the instrument is based around the CdTe detector 28 which has exterior dimensions of, in the preferred embodiment, 2 mm on a side. When a gamma ray hits the detector it generates a pulse which is buffered by the FET amplifier 30. The output of the FET amplifier 30 is fed to the low power amplifier and discriminator 32 to filter out noise pulses. The output of the discriminator 32 is then fed to CPU 26. The input pulses from discriminator 32 are stored and counted by the low battery power microprocessor 26. The Motorola type 146805 processor of the preferred embodiment is a very powerful CMOS 8-bit unit having 16 I/O lines, a programmable timer, and 112-bytes of random access memory (RAM) built into it. These built-in features eliminate the need for external I/O ports and RAM, saving considerable space. In addition, the processor will operate on a supply voltage as low as 3 v and consumes only 20 mW at full operating speed.

CPU 26 is supported by EPROM 40. The operating system for the preferred embodiment is contained in a 1024-byte CMOS EPROM, and it is placed on a separate substrate so that it may easily be removed and reprogrammed. This feature allows the preferred embodiment to have functions tailored to fit a specific application. The display 36, a standard wristwatch display, is mounted on the control substrate. It is driven by a pair of CMOS digital shift registers wired to perform as LCD driver 34.

The dosimeter is a versatile instrument, containing a number of time and radiation dose related features. As a simple wristwatch it can be programmed to keep time in 12 or 24 hour formats. It also has a simple time alarm which can be easily set. As a radiation instrument, it is programmable to respond and alarm in a number of different ways acting, for example, as an accumulated dose meter calibrated in millirads (mR). In this mode, the four large digits of the display will read accumulated dose up to 3000 mR and two digits in the upper right-hand corner of the display will read out the integration time in minutes or hours, as selected by the wearer. A scaler/timer mode allows the dosimeter to act as a count totalizer. The counts are tallied on the display while two small digits keep track of elapsed time, normally settable over the range of 0 to 90 seconds. Those skilled in the art will appreciate that longer and shorter time ranges may be selected and implemented by software changes.

The dosimeter is also programmable to act as a digital ratemeter. In the ratemeter mode, the rate of input pulses in counts per second is read out on the four large digits of the display. The ratemeter will count in the range of 0 to 999 counts per second. Finally, there is a built-in multiscale mode, enabling the instrument to accumulate counts for a given time and store the result. It will do this up to 30 consecutive times. This function allows the wearer to walk through an area taking readings and afterwards gain a clear picture of how the field intensity varies throughout the area of interest.

In addition to the various digital readout functions, there are four audible alarms built into the instrument. The dosimeter will function as an alarm clock. In addition, a background radiation alarm can be set. The instrument takes a 2-second background count and stores it. Later, if the count rate exceeds this base rate, an alarm sounds with the small digits on the display flashing "bA" for background alarm. If the alarm is a rate alarm, a maximum rate is set by the wearer and, if the count rate at any time exceeds this maximum the alarm will sound. In this case, the small digits on the display flash "rA," signifying to the wearer that the maximum count rate has been exceeded. Finally, there is an exposure alarm which warns when the accumulated exposure has exceeded a preset number set by the wearer. An exposure alarm is signified by an "EA" appearing on the small digits of the display.

In addition to the above functions, the wristwatch dosimeter contains an analog ratemeter which reads out count rate regardless of the mode in which the instrument is being used. This ratemeter is a 9-segment bar graph appearing at the bottom of the LCD display. It keeps track of counts per second at all times and presents the information logarithmically over a range of 1 to 512 counts per second. This feature is very useful for the wearer who wishes to know at all times what kind of gamma ray field he is being exposed to.

FIGS. 1-8 are self-explanatory flow charts which describe how the circuit of FIG. 10 functions as abovedescribed.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A wristwatch dosimeter comprising:
 a digital wristwatch housing having a window for a numerical display and detector aperture means;
 a watch-type LCD or LED display disposed at said housing window;
 means within said housing for performing watch functions communicating with said display;
 CdTe detector means disposed in said housing behind said detector aperture means;
 means for storing predetermined safety limits of radiation field and exposure;

microprocessor means connected to said detector means for accumulating and storing radiation field and exposure parameters;

microprocessor means for comparing said parameters with said stored predetermined safety limits; and means for alerting a user of an unsafe condition by alarm when said parameters exceed said safety limits.

2. The invention of claim 1 wherein said alarm is an audio alarm.

3. The invention of claim 1 wherein said alarm is a visual alarm.

4. In a wristwatch dosimeter case including digital wristwatch electronics and display, a combination comprising:

a CdTe crystal for generating an electric pulse when struck by radiation;

an FET amplifier operably connected to said crystal;

means for filtering out noise pulses operably connected to said FET amplifier;

control processor means for storing and counting said filtered pulses comprising a programmable timer for predetermining a time period during which said filtered pulses are stored and counted, and a random access memory for storing said filtered pulses, operable on no more than 3 volts and consuming no more than 20 mW at full operation speed;

external low power read-only memory means for storing predetermined safety limites of radiation and operably connected to said control processor means; and alarm means connected to said control processor means for alerting a user of an unsafe condition when said filtered pulses exceed said safety limits.

5. The invention of claim 4 wherein said control processor means is programmable to provide accumulated dose calibrated in mR.

6. The invention of claim 4 wherein said control processor means is programmable to provide a total count of said filtered pulses over a preselected elapsed time.

7. The invention of claim 4 wherein said control processor means is programmable to act as a digital rate meter for counting the number of said filtered pulses over successive preselected time intervals, said alarm means being responsive to the counting of said pulses for indicating the rate of said filtered pulses over each of said successive time intervals.

8. The invention of claim 4 wherein said alarm means comprises visual and audio alarms and wherein said control processor means comprises means for providing a background radiation alarm through said alarm means.

9. The invention of claim 7 wherein said alarm means comprises a visual alarm and a audio alarm, said visual alarm indicating the rate of said filtered pulses over each of said successive time intervals and said audio alarm indicating a warning when said rate of filtered pulses over each of said successive time intervals exceeds a preselected rate of said filtered pulses.

10. The invention of claim 4 wherein said alarm means comprises visual and audio alarms and wherein said control processor means comprises means for providing visual and audio alarms when accumulated exposure exceeds a preset amount.

11. The invention of claim 10 wherein said alarm means comprises an analog visual indication of dose rate.

* * * * *